(12) United States Patent
Shimodaira et al.

(10) Patent No.: US 8,924,055 B2
(45) Date of Patent: Dec. 30, 2014

(54) VEHICLE CONTROL APPARATUS

(75) Inventors: Seiji Shimodaira, Yokosuka (JP);
Hiroshi Iwano, Yokohama (JP); Susumu Komiyama, Tokyo (JP); Musashi Yamaguchi, Uozu (JP); Hideaki Watanabe, Yokosuka (JP); Tetsuya Ikeda, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1373 days.

(21) Appl. No.: 11/782,853

(22) Filed: Jul. 25, 2007

(65) Prior Publication Data

US 2008/0059022 A1 Mar. 6, 2008

(30) Foreign Application Priority Data

Sep. 5, 2006 (JP) ................................. 2006-240099

(51) Int. Cl.
- *B60W 10/26* (2006.01)
- *B60L 11/18* (2006.01)
- *B60L 15/20* (2006.01)

(52) U.S. Cl.
CPC ......... *B60L 11/1851* (2013.01); *B60L 15/2045* (2013.01); *Y02T 10/646* (2013.01); *Y02T 10/70* (2013.01); *Y02T 10/7005* (2013.01); *Y02T 10/705* (2013.01); *Y02T 10/7283* (2013.01); *Y02T 10/648* (2013.01)
USPC ..................... 701/22; 180/65.21; 180/65.265; 180/65.285; 180/65.29; 701/36

(58) Field of Classification Search
USPC .......... 180/65.225, 62.245, 62.285, 165, 443, 180/446, 65.21, 65.265, 65.27, 65.275, 180/65.28, 65.285, 65.29; 701/36, 22; 903/916, 917
See application file for complete search history.

(56) References Cited

U.S. PATENT DOCUMENTS

| 5,222,568 A | * | 6/1993 | Higasa et al. ............... 180/65.51 |
| 5,758,741 A | * | 6/1998 | Tomioka ....................... 180/446 |
| 5,898,282 A | * | 4/1999 | Drozdz et al. ................ 318/139 |

(Continued)

FOREIGN PATENT DOCUMENTS

| JP | H11-078952 A | 3/1999 |
| JP | 2000-032608 A | 1/2000 |

(Continued)

OTHER PUBLICATIONS

Abe, Jidoshano Undo to Seigyo (Movement and Control of Automobiles), Second Edition, Chapter No. 3, pp. 50-72, Sankaido K.K., Japan.

*Primary Examiner* — Stephen Holwerda
(74) *Attorney, Agent, or Firm* — Global IP Counselors, LLP

(57) ABSTRACT

A vehicle control apparatus includes a motor unit, a power accumulating device, a charging power control section, a vehicle state detecting section, a braking/driving force control section, a turning determination section and a charging power correction section. The motor unit is configured to generate an independent driving/braking force for at least each of left and right driving wheels. The charging power control section is configured to set charging power supplied to the power accumulating device in accordance with a power accumulation state of the power accumulating device. The braking/driving force control section is configured to control a braking force or a driving force generated by the motor unit based on the operating state of the vehicle. The turning determination section is configured to determine whether a prescribed vehicle turning condition exists. The charging power correction section is configured to increase the charging power when the prescribed vehicle turning condition exists.

9 Claims, 17 Drawing Sheets

(56) References Cited

U.S. PATENT DOCUMENTS

| | | | |
|---|---|---|---|
| 6,268,825 B1* | 7/2001 | Okada | 342/357.52 |
| 6,868,318 B1* | 3/2005 | Cawthorne et al. | 701/22 |
| 2001/0017227 A1* | 8/2001 | Amano et al. | 180/65.2 |
| 2001/0023383 A1* | 9/2001 | Ishihara et al. | 701/41 |
| 2002/0062183 A1* | 5/2002 | Yamaguchi et al. | 701/22 |
| 2002/0175657 A1* | 11/2002 | Leboe | 320/132 |
| 2004/0108837 A1* | 6/2004 | Lai et al. | 320/137 |
| 2004/0154859 A1* | 8/2004 | Kawada et al. | 180/446 |
| 2006/0048982 A1* | 3/2006 | Yamamoto et al. | 180/65.2 |

FOREIGN PATENT DOCUMENTS

| | | |
|---|---|---|
| JP | 2001-238305 A | 8/2001 |
| JP | 2003-300468 A | 10/2003 |
| JP | 2004-312961 A | 11/2004 |
| JP | 2005-354762 A | 12/2005 |

* cited by examiner

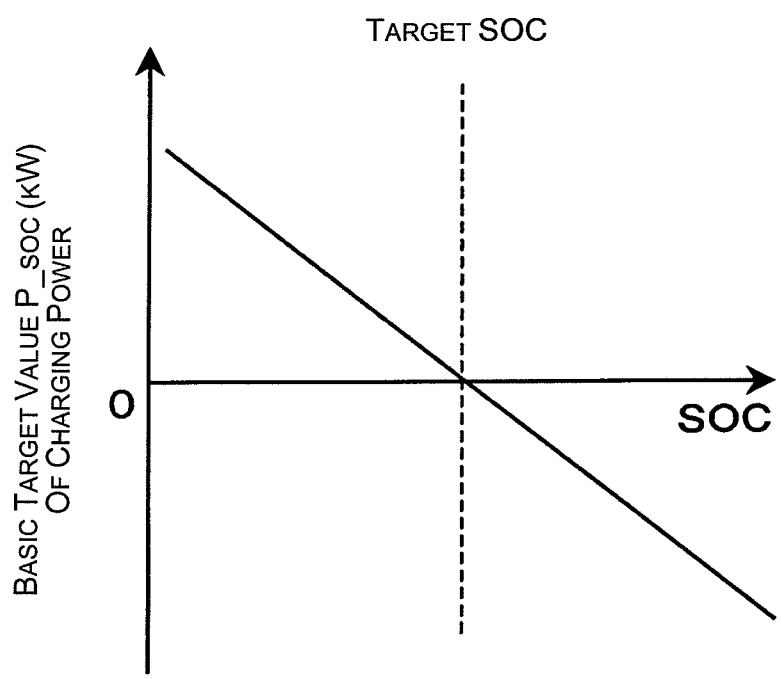
F I G. 3

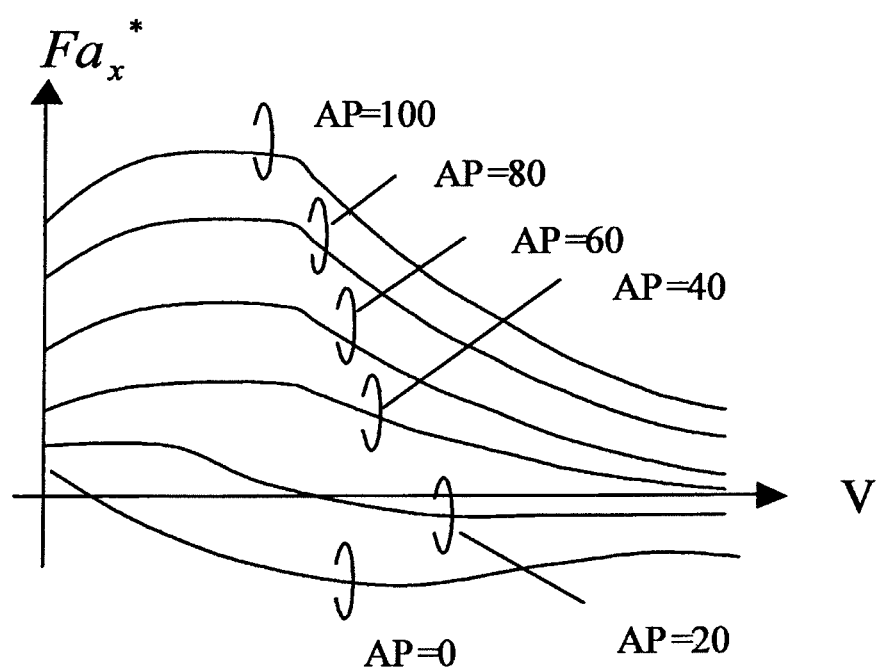
F I G. 7

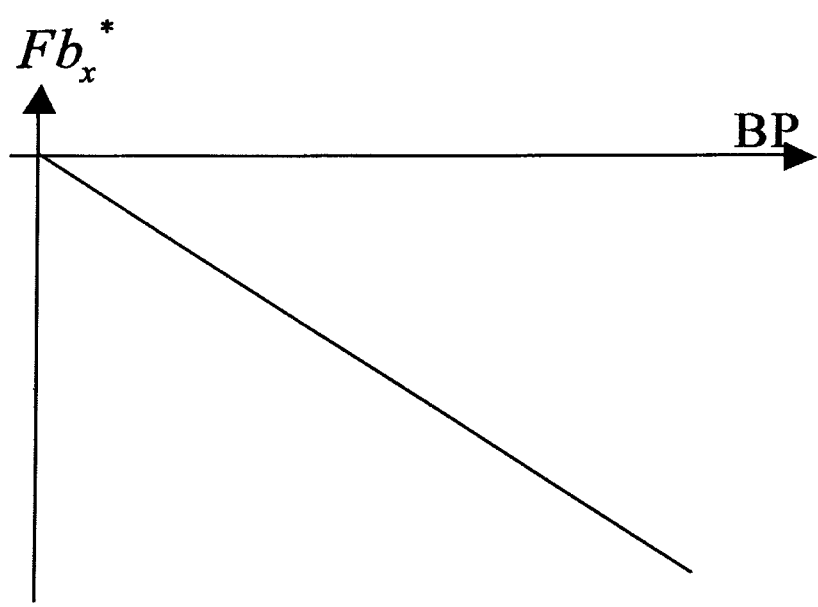
F I G. 8

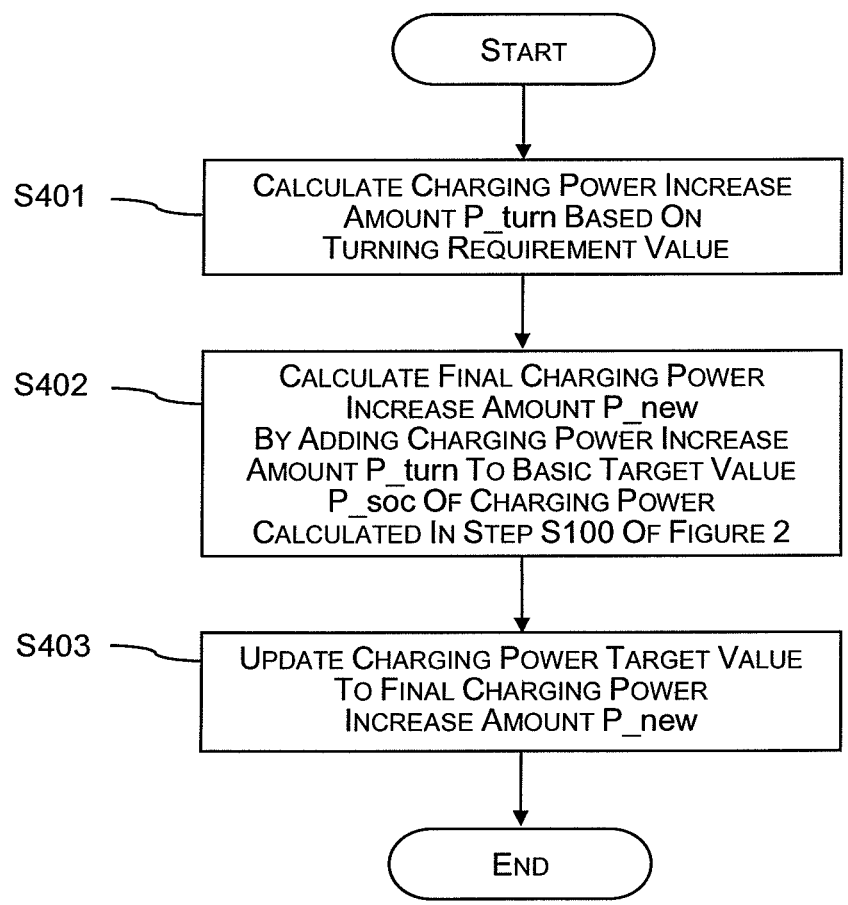
F I G. 10

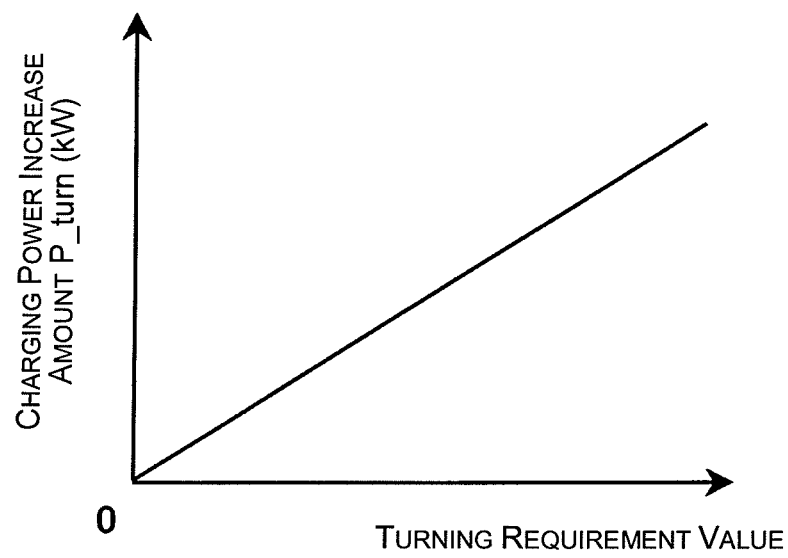
F I G. 11

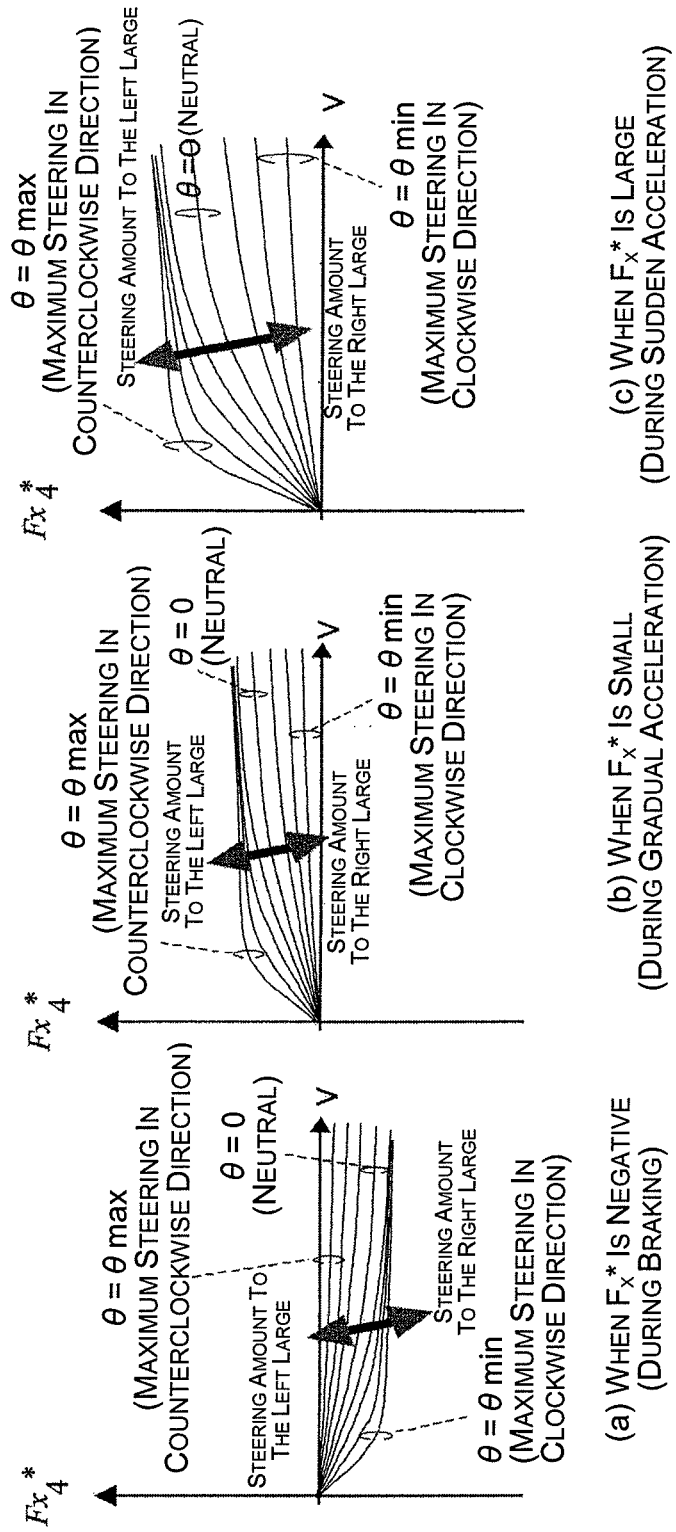
F I G. 17

VEHICLE CONTROL APPARATUS

CROSS-REFERENCE TO RELATED APPLICATIONS

This application claims priority to Japanese Patent Application No. 2006-240099 filed on Sep. 5, 2006. The entire disclosure of Japanese Patent Application No. 2006-240099 is hereby incorporated herein by reference.

BACKGROUND OF THE INVENTION

1. Field of the Invention

The present invention generally relates to a vehicle control apparatus for an electric vehicle having a power accumulating device and a motor. More specifically, the present invention relates a vehicle control apparatus configured to control a power accumulation state of a power accumulating device when the vehicle is turning.

2. Background Information

Japanese Laid-Open Patent Application Publication No. 2005-354762 discloses a conventional vehicle control apparatus in which a target yaw moment when the vehicle is turning is determined based on a vehicle speed and a steering angle. Then, in the conventional vehicle control apparatus, motors installed on the left and right wheels, respectively, are controlled to produce a difference in left and right driving forces so that the target yaw moment is achieved.

In view of the above, it will be apparent to those skilled in the art from this disclosure that there exists a need for an improved vehicle control apparatus. This invention addresses this need in the art as well as other needs, which will become apparent to those skilled in the art from this disclosure.

SUMMARY OF THE INVENTION

In the conventional vehicle control apparatus as disclosed in the above mentioned reference, although the target yaw moment can be generated by the difference in the driving forces generated by the left and right driving wheel motors, no consideration is given to the power accumulation state of the power accumulating device installed in the vehicle. Consequently, in cases where the power accumulation state of the power accumulating device drops and the output of the motors are restricted, the target yaw moment cannot be achieved in the conventional vehicle control apparatus.

The present invention was devised in light of the problems in the prior art described above. One object of the present invention is to provide a vehicle control apparatus configured and arranged to ensure a sufficient time in which a motor assist control is performed during turning of the vehicle as compared to the conventional vehicle control apparatus, and to improve the tracking characteristics of the vehicle behavior with respect to target vehicle behavior.

In order to achieve the above object of the present invention, a vehicle control apparatus includes a motor unit, a power accumulating device, a charging power control section, a vehicle state detecting section, a braking/driving force control section, a turning determination section and a charging power correction section. The motor unit is configured and arranged to generate an independent driving/braking force for at least each of left and right driving wheels. The power accumulating device is configured and arranged to supply electric power to the motor unit. The charging power control section is configured to set charging power supplied to the power accumulating device in accordance with a power accumulation state of the power accumulating device. The vehicle state detecting section is configured to detect an operating state of the vehicle. The braking/driving force control section is configured to control at least one of a braking force and a driving force generated by the motor unit based on the operating state of the vehicle detected by the vehicle state detecting section. The turning determination section is configured to determine whether a prescribed vehicle turning condition exists, which indicates the vehicle is requested to turn. The charging power correction section is configured to increase the charging power set by the charging power control section when the prescribed vehicle turning condition exists.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a schematic diagram showing a first example of a map (table) used to determine the relationship between a target value of a charging power and a state of charge (SOC) of a power accumulating device of the vehicle control apparatus in accordance with the first embodiment of the present invention;

FIG. 7 is a schematic diagram showing one example of a target driving force map used to determine a target driving force with respect to a vehicle speed and an amount of depression of an accelerator pedal in the vehicle control apparatus in accordance with the first embodiment of the present invention;

FIG. 8 is a schematic diagram showing one example of a target braking force map used to determine a target braking force with respect to an amount of depression of a brake pedal in the vehicle control apparatus in accordance with the first embodiment of the present invention;

FIG. 10 is a flowchart showing a charging power target value increase calculation control executed in the vehicle control apparatus in accordance with the first embodiment of the present invention;

FIG. 11 is a schematic diagram showing a first example of a charging power increase amount map (table) used to determine an increase amount in the charging power with respect to a turning requirement value in the vehicle control apparatus in accordance with the first embodiment of the present invention;

FIG. 17 is a diagram showing one example of a target driving force distribution map for the right rear wheel used in the vehicle control apparatus in accordance with the first embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
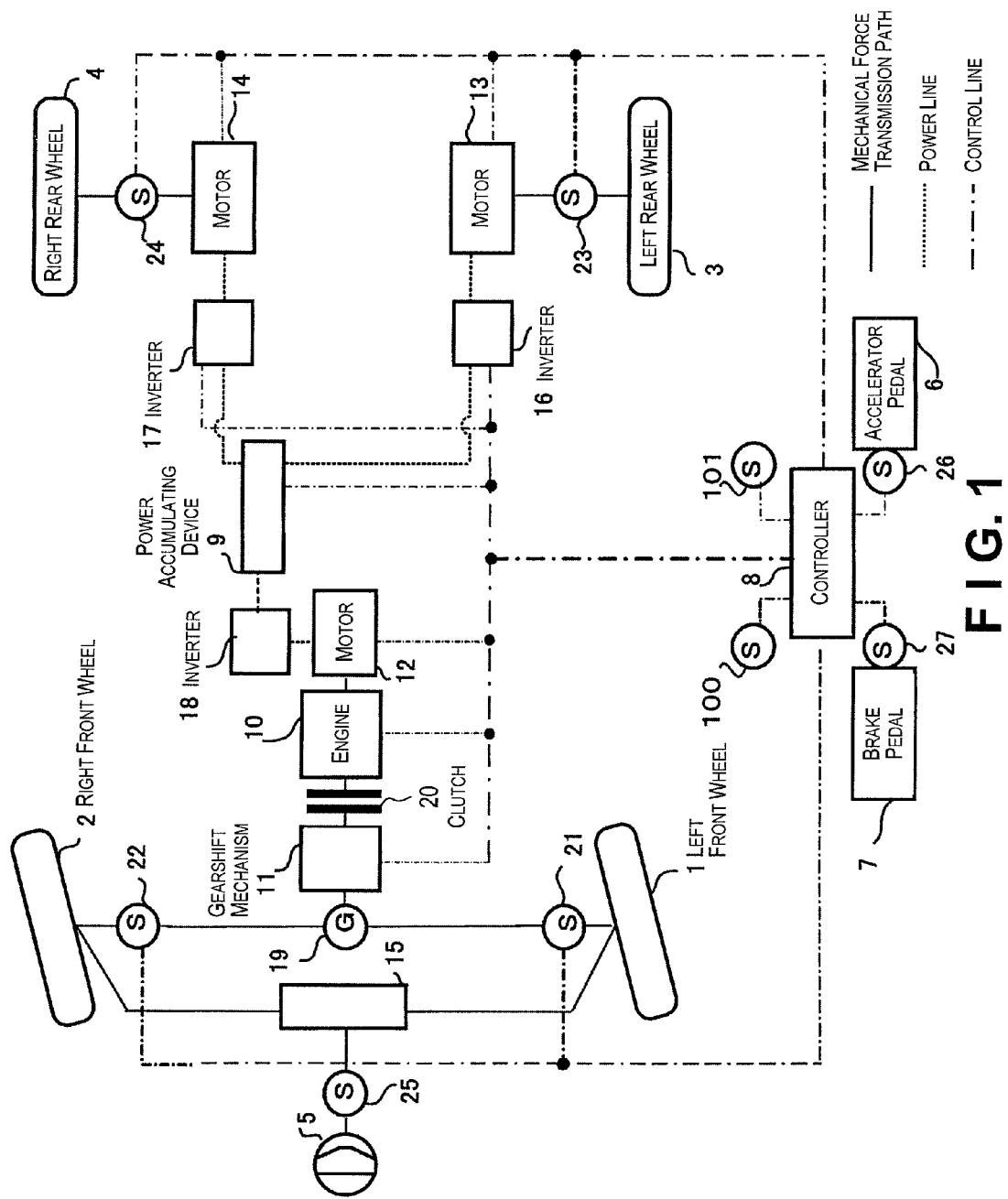
FIG. 1 is an overall schematic structural diagram of a vehicle having a vehicle control apparatus in accordance with a first embodiment of the present invention.

Referring initially to FIG. 1, a vehicle (e.g., electric vehicle) having a vehicle control apparatus in accordance with a first embodiment of the present invention is illustrated. FIG. 1 is an overall schematic diagram showing one example of an overall structure of the vehicle having the vehicle control apparatus of the first embodiment.

As shown in FIG. 1, the vehicle includes a left front wheel 1, a right front wheel 2, a left rear wheel 3, a right rear wheel 4, a steering wheel (handle) 5, an accelerator pedal 6, a brake pedal 7, a controller 8, a power accumulating device 9 and a power train. The power train of the vehicle has a driving force transmission path for the left and right front wheels 1 and 2 including an internal combustion engine 10, a gear shift mechanism 11, a motor 12, a speed reduction gear 19, and a clutch 20. A steering gear 15 is disposed between the steering wheel 5 and the left and right front wheels 1 and 2. The power train also has a driving force transmission path for the left and right rear wheels 3 and 4 including a pair of motors 13 and 14 (motor unit) configured and arranged to drive the left and right rear wheels 3 and 4, respectively. Therefore, the vehicle is configured and arranged to selectively perform four-wheel drive operation. The vehicle further includes a plurality of inverters 16, 17 and 18 that are coupled to the motors 13, 14 and 12, respectively. Moreover, the vehicle includes a plurality of wheel speed sensors 21 to 24, a steering angle sensor 25, an accelerator stroke sensor 26, a brake stroke sensor 27, an acceleration sensor 100 and a yaw rate sensor 101.

The motors 12 to 14 are preferably conventional alternating-current electric motors that are configured and arranged to perform the power exerting operation and the power regenerating operation, such as conventional three-phase synchronous electric motors, conventional three-phase induction electric motors or the like. The power accumulating device 9 is preferably a nickel hydrogen battery or lithium ion battery. Each of the inverters 16 to 18 is configured and arranged to convert the alternating current generated by corresponding one of the motors 12 to 14 into a direct current to charge the power accumulating device 9, or to convert the direct current discharged from the power accumulating device 9 into an alternating current to supply the alternating current to corresponding one of the motors 12 to 14.

During acceleration of the vehicle, i.e., in cases where a force $F_x^*$ acting in the front-rear direction of the vehicle is a positive value, the motors 13 and 14 operate in a state of power exertion (power running). Therefore, the electric power that is generated by the motor 12 driven by the internal combustion engine 10 is used as charging power that is supplied to the power accumulating device 9. On the other hand, during braking of the vehicle, i.e., in cases where the force $F_x^*$ acting in the front-rear direction of the vehicle is a negative value, the power regenerated by the motors 12 to 14 is used as charging power that is supplied to the power accumulating device 9. In this description of the first embodiment of the present invention, the direction of the force that causes acceleration of the vehicle in the forward direction is taken as the positive direction.

The torque of the engine 10, the torque of the motor 12 driven by electric power supplied from the power accumulating device 9, or the torque that is generated by both the engine 10 and the motor 12, is transmitted to the left and right front wheels 1 and 2 via the gearshift mechanism 11 and the speed reduction gear 19. Furthermore, the torque of the motor 13 driven by the electric power supplied from the power accumulating device 9, by the power generated by the motor 12, or by both of the power supplied from the power accumulating device 9 and the power generated by the motor 12, is transmitted to the left rear wheel 3. Similarly, the torque of the motor 14 driven by the electric power supplied from the power accumulating device 9, by the power generated by the motor 12, or by both of the power supplied from the power accumulating device 9 and the power generated by the motor 12, is transmitted to the right rear wheel 4. The rotational speeds of the wheels 1 to 4 are detected by the wheel speed sensors 21 to 24, respectively. The detected rotational speeds of the wheels 1 to 4 are transmitted to the controller 8.

In the first embodiment of the present invention, the steering angle of the left and right front wheels 1 and 2 is preferably mechanically adjusted by the steering operation of the steering wheel 5 by a driver via the steering gear 15. Furthermore, the change amount in the steering angle of the left and right front wheels 1 and 2 is set to be 1/16 of the change amount in the steering angle of the steering wheel 5. Alternatively, a conventional steer-by-wire system that is configured and arranged to control the steering angle of the left and right front wheels 1 and 2 independently of the change amount in the steering angle of the steering wheel 5 can be installed in the vehicle to adjust the steering angle of the left and right front wheels 1 and 2.

The steering angle sensor 25 is configured and arranged to detect a steering angle θ of the steering wheel 5 controlled by the driver, and to output a signal indicative of the steering angle θ to the controller 8. The accelerator stroke sensor 26 is configured and arranged to detect an amount of depression of the accelerator pedal 6, and to output a signal indicative of the amount of depression of the accelerator pedal 6 to the controller 8. The brake stroke sensor 27 is configured and arranged to detect an amount of depression of the brake pedal 7, and to output a signal indicative of the amount of depression of the brake pedal 7 to the controller 8. The acceleration sensor 100 is configured and arranged to detect an acceleration of the vehicle, and to output a signal indicative of the acceleration of the vehicle to the controller 8. The yaw rate sensor 101 is configured and arranged to detect a yaw rate of the vehicle, and to output a signal indicative of the yaw rate to the controller 8. In the first embodiment of the present invention, a charging state of the power accumulating device 9, i.e., the power accumulation state or the state of charge (SOC), is detected by a conventional power accumulation state detection method. For example, the controller 8 can be configured to first determine an initial value of the state of charge SOC based on a voltage detection value of a voltage sensor (not shown) configured and arranged to detect the open discharge voltage of the power accumulating device 9, and then to detect the state of charge SOC by multiplying the current detection value of a current sensor (not shown) configured and arranged to detect the charge or discharge current entering or exiting the power accumulating device 9 over time.

The controller 8 preferably includes a microcomputer with an operating point control that controls the operating points of the engine 10 and the motors 12 to 14 as discussed below. The controller 8 can also include other conventional components such as an input interface circuit, an output interface circuit, an inverter circuit, and storage devices such as a ROM (Read Only Memory) device and a RAM (Random Access Memory) device. The microcomputer of the controller 8 is programmed to control the various components of the vehicle including the engine 10, the motors 12 to 14, etc. The memory circuit stores processing results and control programs such as ones for the charging power target value increase operation that are run by the processor circuit. The controller 8 is operatively coupled to the various components of the vehicle in a conventional manner. The internal RAM of the controller 8 stores statuses of operational flags and various control data. The internal ROM of the controller 8 stores the various data for various operations. The controller 8 is capable of selectively controlling any of the components of the control system in accordance with the control program. It will be apparent to those skilled in the art from this disclosure that the precise structure and algorithms for the controller 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 8 is configured to receive output signals indicative of the operating state of the vehicle detected by the wheel speed sensors 21 to 24, the steering angle sensor 25, the accelerator stroke sensor 26, the brake stroke sensor 27, the acceleration sensor 100, the yaw rate sensor 101, and the like.

The controller 8 is configured to perform a torque distribution control for realizing the target braking force/driving force distribution in the engine 10 and the motors 12 to 14 based on the output signals indicative of the operating state of the vehicle. Furthermore, various control maps described in more detail later are stored in the memory device.

The controller 8 is configured to perform a motor assist control in which a difference in the driving forces of the motors 13 and 14 is generated so that a target vehicle behavior (e.g., a target yaw moment) is achieved during turning of the vehicle. More specifically, in the first embodiment of the present invention, the controller 8 is configured to increase the charging power (i.e., the power generated by the motor 12) supplied to the power accumulating device 9 when the vehicle is determined to be turning (i.e., from the time that turning of the vehicle is initiated) in accordance with the power accumulation state (the state of charge SOC) of the power accumulating device 9. Therefore, the discharge of the electric power from the power accumulating device 9 during turning of the vehicle can be reduced.

Figure 2:
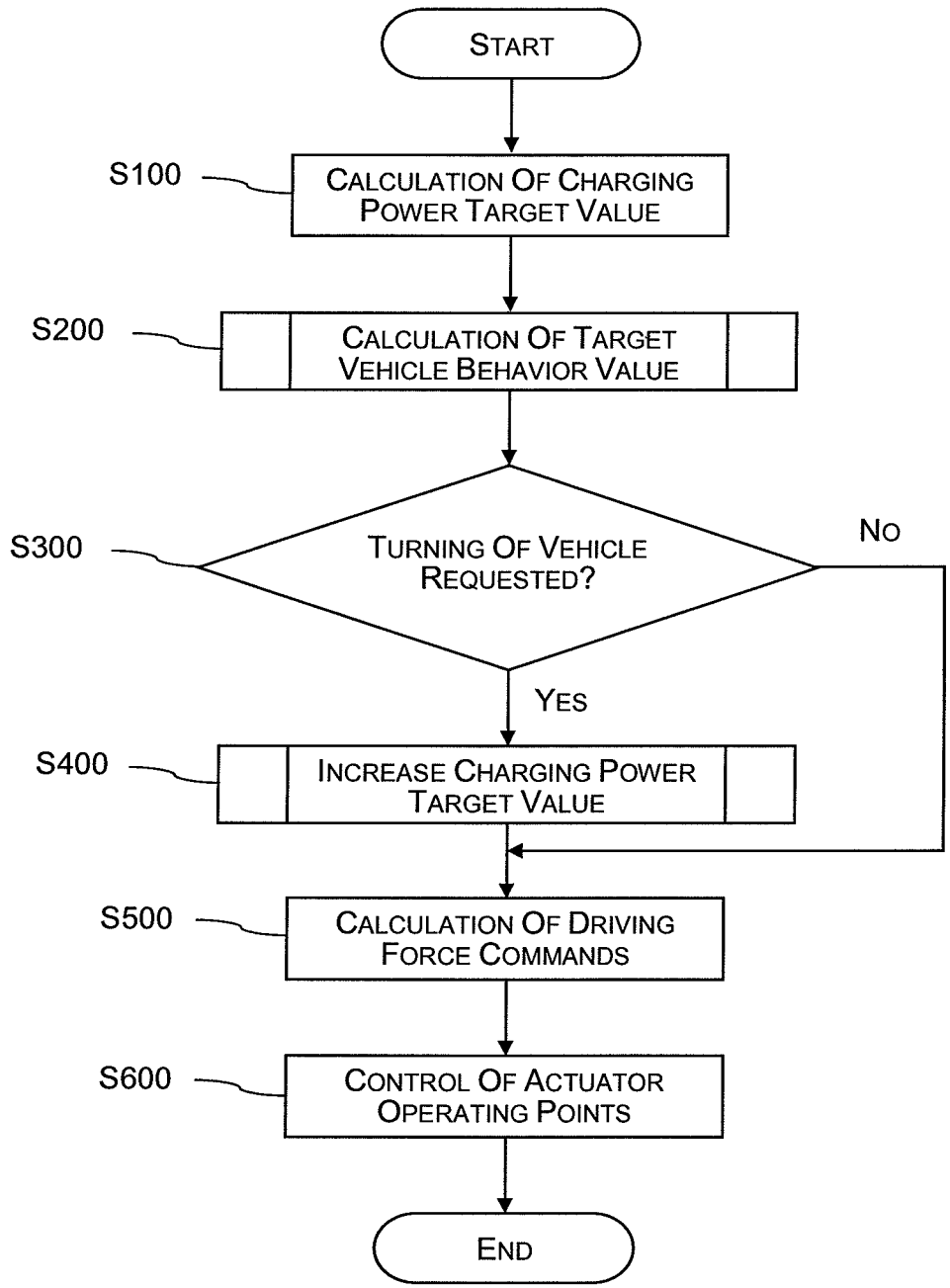
FIG. 2 is a flowchart showing a main control executed by the vehicle control apparatus in accordance with the first embodiment of the present invention.

Referring now to the flowchart of FIG. 2, a main control performed by the controller 8 in the vehicle shown in FIG. 1 will be described. For example, the controller 8 is preferably configured to repeatedly perform the main control shown in the flowchart of FIG. 2 at prescribed time intervals (e.g., 10 ms). The main control illustrated in FIG. 2 is preferably performed during acceleration of the vehicle. The main control illustrated in FIG. 2 need not be performed during braking of the vehicle because the state of charge SOC of the power accumulating device 9 usually does not drop during braking of the vehicle due to the power regeneration of the motors 12 to 14. The controller 8 is configured to determine whether or not the vehicle is accelerating based on, for example, the increase in the vehicle speed V, the sign (positive or negative) of the force acting in the front-rear direction of the vehicle (i.e., the force (target value) $F_x^*$ acting in the front-rear direction of the vehicle), and the like.

In step S100, the controller 8 is configured to calculate a basic target value of the charging power supplied to the power accumulating device 9 in accordance with the power accumulation state (the state of charge SOC) of the power accumulating device 9.

In step S200, the controller 8 is configured to calculate a target vehicle behavior value (a target yaw rate γ, a target lateral acceleration $G_y$, a vehicle lateral slipping angle β, or the like) based on the accelerator position AP, the vehicle speed V, and the steering angle θ of the steering wheel 5.

In step S300, the controller 8 is configured to determine whether a prescribed vehicle turning condition exists, i.e., whether or not turning of the vehicle is requested, based on a turning requirement value (the target yaw rate γ or the like). In the first embodiment of the present invention, the turning requirement value preferably refers to a value that indicates a magnitude of the turning of the vehicle that is required or requested, and that is used to perform turning control of the vehicle during turning of the vehicle. In the first embodiment, the turning requirement value includes at least one of the detected steering angle θ of the steering wheel 5, the target yaw rate γ, the target lateral acceleration $G_y$, and the target lateral slipping angle β. If the controller 8 determines that turning of the vehicle is requested in step S300 (Yes in step S300), then the processing proceeds to step S400 in order to increase the charging power supplied to the power accumulating device 9. On the other hand, if the controller 8 determines that turning of the vehicle is not requested in step S300 (No in step S300), then the processing skips step S400 and proceeds to step S500.

In step S400, the controller 8 is configured to calculate an increase amount in the charging power in accordance with the turning requirement value determined in step S300, and to correct (increase) the charging power target value calculated in step S100.

In step S500, the controller 8 is configured to calculate driving force command values for the respective wheels 1 to 4 to achieve the target behavior represented by the target vehicle behavior value calculated in step S200.

In step S600, the controller 8 is configured to set and control the operating points of the engine 10 and the motors 12 to 14 so that the driving force command values calculated in step S400 and the charging power target value calculated in step S100 are realized. Furthermore, the controller 8 is configured to appropriately control the gearshift mechanism 11 and clutch 20 so that the operating points are realized.

The control processing executed in steps S100, S200, S300, S400, S500, and S600 in the flowchart shown in FIG. 2 respectively corresponds to the charging power target value calculating section, the target vehicle behavior calculating section, the turning determination section, the charging power target value increase calculating section (charging power correction section), the driving force command value calculating section, and the actuator operating point control section of the present invention. More specifically, the control processing in steps S100 and S600 preferably corresponds to the charging power control section, and the control processing in steps S200, S500 and S600 preferably correspond to the braking/driving force control section.

Next, the respective processing routines performed by the controller 8 in steps S100 to S600 will be described in more detail.

Charging Power Target Value Calculation (Step S100)

In the calculation of the charging power target value in step S100, the controller 8 is configured to refer to a map such as one shown in FIG. 3 to determine a basic target value P_soc (kW) of the charging power that is supplied to the power accumulating device 9 based on the power accumulation state SOC of the power accumulating device 9. FIG. 3 shows one example of the map used to calculate the basic target value P_soc of the charging power in accordance with the power accumulation state SOC. As shown in FIG. 3, the basic target value P_soc of the charging power increases as the detected state of charge SOC drops relative to a target value of the state of charge SOC. More specifically, the map shown in FIG. 3 is set so that the basic target value P_soc of the charging power increases in proportion to a difference obtained by subtracting the detected state of charge SOC from the target value of the state of charge SOC. Furthermore, when the basic target value P_soc of the charging power is a negative value, the basic target value P_soc indicates a discharge power discharged from the power accumulating device 9.

Figure 4:
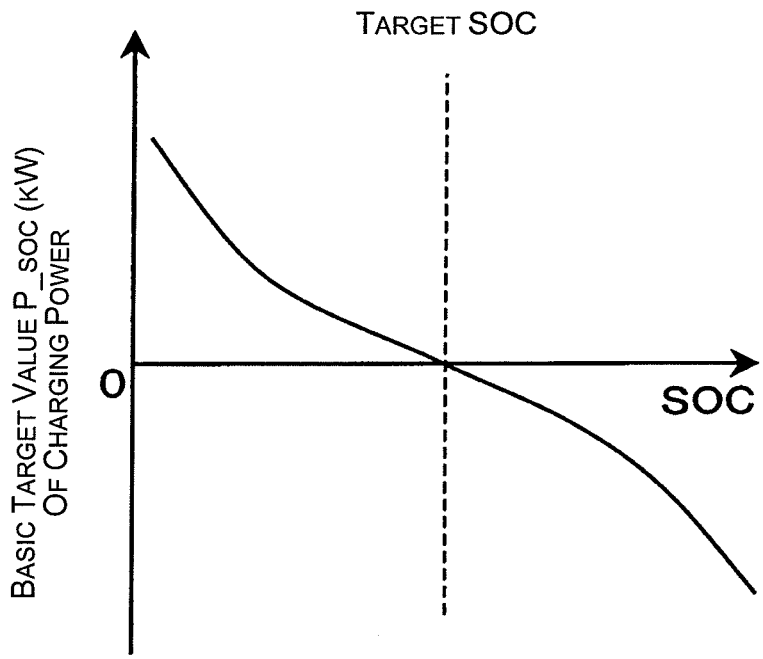
FIG. 4 is a schematic diagram showing a second example of a map (table) used to determine the relationship between the charging power target value and the state of charge (SOC) of the power accumulating device of the vehicle control apparatus in accordance with the first embodiment of the present invention.

Moreover, in FIG. 3, the basic target value P_soc of the charging power is in a linear relationship with respect to the state of charge SOC. Alternatively, as shown in FIG. 4, a non-linear relationship between the state of charge SOC and the basic target value P_soc of the charging power can be set. In such case, as shown in FIG. 4, the basic target value P_soc of the charging power increases as the state of charge SOC becomes lower.

Figure 5:
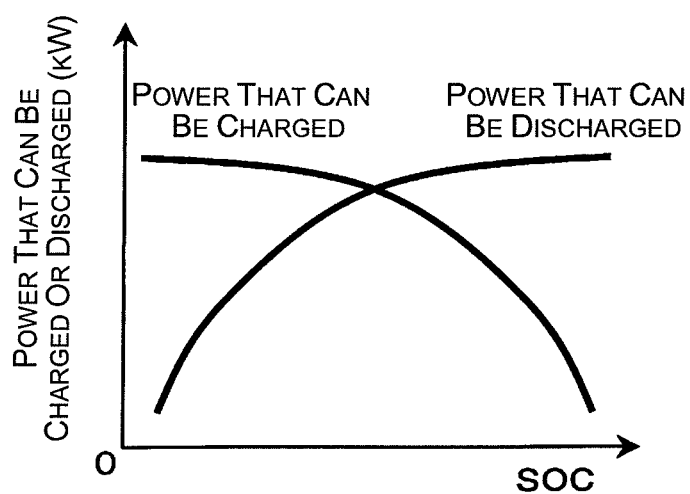
FIG. 5 is a schematic diagram showing one example of a map (table) used to determine the relationship between the power that can be charged or discharged and the state of charge (SOC) of the power accumulating device of the vehicle control apparatus in accordance with the first embodiment of the present invention.

Furthermore, the maps shown in FIG. 3 and FIG. 4 are set within a range of the electric power that can be charged or discharged by the power accumulating device 9, i.e., the basic target value P_soc of the charging power does not exceed the maximum power that can be charged or discharged by the power accumulating device 9. One example of the maximum power that can be charged or discharged by the power accumulating device 9 is shown in FIG. 5. Generally, as shown in FIG. 5, the power that can be charged by the power accumulating device 9 tends to become higher as the state of charge SOC becomes lower, and the power that can be discharged from the power accumulating device 9 tends to become lower as the state of charge SOC becomes lower.

Target Vehicle Behavior Value Calculation (Step S200)

Figure 6:
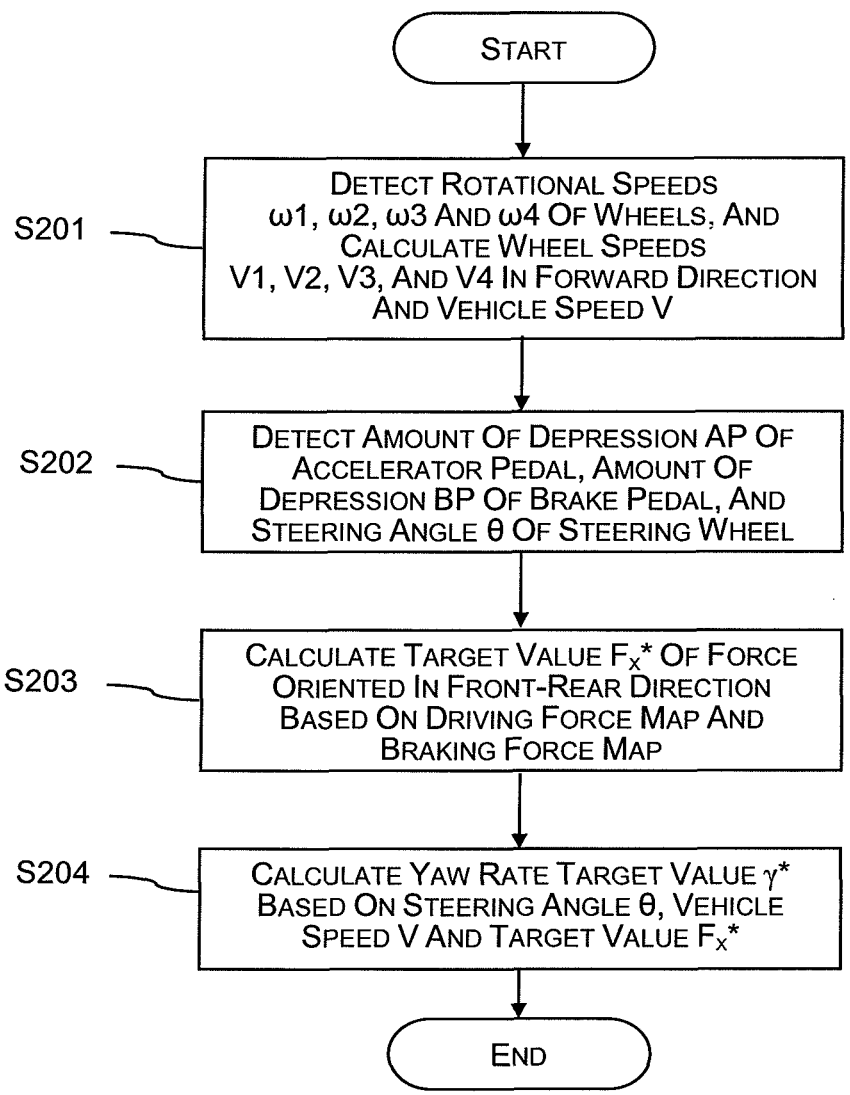
FIG. 6 is a flowchart showing a target vehicle behavior calculation control executed by the vehicle control apparatus in accordance with the first embodiment of the present invention.

FIG. 6 shows a flowchart illustrating the control flow of the processing of the target vehicle behavior calculation executed in step S200 of FIG. 2. In the control illustrated in FIG. 6, the target yaw rate γ is used as the target vehicle behavior value calculated in step S200 of FIG. 2.

In step S201 of FIG. 6, the controller 8 is configured to detect rotational speeds ω1, ω2, ω3, and ω4 (rad/s) of the wheels 1 to 4, respectively, based on the output signals from the wheel speed sensors 21 to 24, respectively. The controller 8 is further configured to multiply the rotational speeds ω1, ω2, ω3, and ω4 by the radii R of the wheels 1 to 4 to obtain the speeds $V_1$, $V_2$, $V_3$, and $V_4$ (m/s) of the wheels 1 to 4, respectively. Furthermore, the controller 8 is configured to determine the vehicle speed V (m/s) by using the following Equation (1).

$$V=(V_1+V_2+V_3+V_4)/4 \quad \text{Equation (1)}$$

In step S202, the controller 8 is configured to detect the amount of depression AP (%) of the accelerator pedal 6 and the amount of depression BP (%) of the brake pedal 7 based on the output signals from the accelerator stroke sensor 26 and the brake stroke sensor 27, respectively. The controller 8 is further configured to detect the steering angle θ (rad) of the steering wheel 5 based on the output signal from the steering angle sensor 25.

In step S203, the controller 8 is configured to determine the target value $F_x^*$ of the force oriented in the front-rear direction of the vehicle by using Equation (2) based on the amount of depression AP of the accelerator pedal 6, the amount of depression BP of the brake pedal 7, and the vehicle speed V.

$$F_x^*=Fa_x^*+Fb_x^* \quad \text{Equation (2)}$$

In the Equation (2), a value $Fa_x^*$ represents the target driving force determined with reference to the target driving force map (e.g., the map shown in FIG. 7) based on the amount of depression AP of the accelerator pedal 6, and the vehicle speed V. Furthermore, a value $Fb_x^*$ represents the target braking force determined with reference to the target braking force map (e.g., the map shown in FIG. 8) based on the amount of depression BP of the brake pedal 7. The target driving force map and the target braking force map can be set as shown, for example, in FIGS. 7 and 8, respectively. Moreover, in the values $F_x^*$, $Fa_x^*$ and $Fb_x^*$, the direction of the force that causes acceleration of the vehicle in the forward direction is taken as the positive direction.

Figure 9:
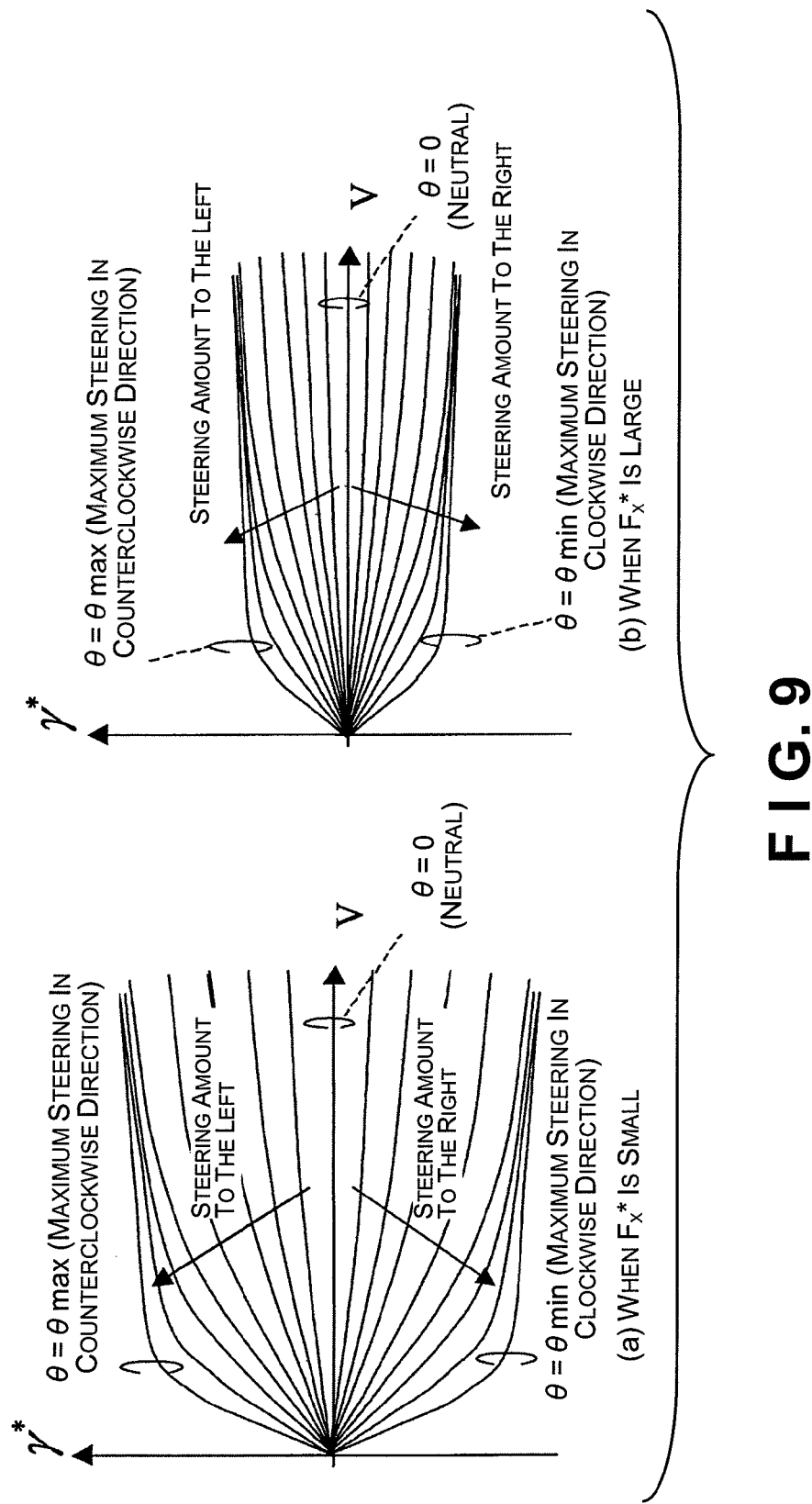
FIG. 9 is a schematic diagram showing one example of a target yaw rate map used to determine a target yaw rate with respect to a steering angle, a vehicle speed and a target value of the force oriented in the front-rear direction of the vehicle in the vehicle control apparatus in accordance with the first embodiment of the present invention.

In step S204, the controller 8 is configured to refer to the target yaw rate map such as one shown in FIG. 9 to determine a static value γ* of the yaw rate as the target yaw rate γ based on the target value $F_x^*$ of the force oriented in the front-rear direction of the vehicle set in step S203, the steering angle θ of the steering wheel 5, and the vehicle speed V. Here, the target yaw rate γ is taken as an example of the target vehicle behavior value. The static value γ* of the yaw rate refers to the target value in a case where the vehicle speed V is constant. As is shown in FIG. 9, the target yaw rate γ as the steering angle θ of the steering wheel 5 or the vehicle speed V increases. Furthermore, in FIG. 9, only a map for a case in which the target value $F_x^*$ of the force oriented in the front-rear direction of the vehicle is large (the diagram (a)) and a map for a case in which the target value $F_x^*$ of the force oriented in the front-rear direction of the vehicle is small (the diagram (b)) are shown. However, the target yaw rate map as shown in FIG. 9 is preferably set for respective values of the target value $F_x^*$ of the force oriented in the front-rear direction of the vehicle.

If the controller 8 is configured to calculate the target yaw rate for the purpose of performing the lane departure avoidance control, the collision avoidance control or the like (e.g., when the controller 8 is configured to control the driving/braking forces of the motors 13 and 14 in accordance with the target yaw rate), the target yaw rate calculated for those controls can be used as the target yaw rate γ in step S204.

For example, the target yaw rate map described above (FIG. 9) is set as follows by simulation or experimentation using a well known method. In the first embodiment, the coefficient of friction of the road surface over which the vehicle is traveling is assumed to be a fixed value at 1.0, and the driving force that is distributed to the wheels 1 to 4 is distributed according to the wheel load ratio. However, the present invention is not limited to such arrangement.

Initially, the vehicle is operated to travel by simulation or experimentation with a steering angle θ' of the steering wheel 5 and the force Fx' oriented in the front-rear direction of the vehicle.

Next, the driving forces distributed to the wheels 1 to 4 is calculated by convergent calculation in accordance with the variation in the wheel load created by the force oriented in the lateral direction of the vehicle during travel. When a sufficient time has elapsed since the vehicle speed V' has reached a constant steady state (steady circular turning state), the driving forces $Fx_i'$ (i=1, 2, 3, 4) of the respective wheels (i.e., a driving force $Fx_1'$ of the left front wheel, a driving force $Fx_2'$ of the right front wheel, a driving force $Fx_3'$ of the left rear wheel, a driving force $Fx_4'$ and of the right rear wheel) and the yaw rate γ' that are in operation are determined. Finally, the yaw rate γ' corresponding to the values of the steering angle θ', the vehicle speed V', and the force Fx' oriented in the front-rear direction of the vehicle that are in operation for each simulation or experimentation is set in the target yaw rate map. The method used to set the target yaw rate map described above can also be used to calculate the driving force command values in step S500 described later.

Furthermore, in cases where the left and right front wheels 1 and 2 are not independently driven as in the vehicle shown in FIG. 1, the sum of the driving forces for the left front wheel 1 and the right front wheel 2 is set in the driving force distribution map as the front wheel driving force. The same is true in cases where the left and right rear wheels 3 and 4 are not independently driven.

When the target lateral acceleration $G_y$ or the target lateral slipping angle β of the vehicle is used as the target vehicle behavior value that is to be realized, a map of the target lateral acceleration or map of the lateral slipping angle of the vehicle corresponding to the steering angle θ of the steering wheel 5 or the vehicle speed V can be prepared by simulation or experimentation in the same manner as the target yaw rate map described above. In such case, the target lateral acceleration $G_y$ or the target lateral slipping angle β can be calculated based on the steering angle θ of the steering wheel 5 or the vehicle speed V.

Furthermore, the relationship of the target yaw rate γ or the target lateral slipping angle β to the steering angle θ of the steering wheel 5 or the vehicle speed V in the map is in steady circular turning state as described in M. Abe, '*Jidosha no Undo to Seigyo* (*Movement and Control of Automobiles*)', Second Edition, Sankaido K. K. (p. 63, p. 72) or Equations 4 and 5 in Japanese Laid-Open Patent Application Publication No. 11-078952. Furthermore, in the steady circular turning state, since the target lateral acceleration $G_y$ is given by the product of the vehicle speed V and the target yaw rate γ, a target lateral acceleration map can also be prepared based on the target yaw rate map.

Turning Requirement Determination (Step S300)

In step S300 of FIG. 2, the controller 8 is configured to determine whether or not turning of the vehicle is requested (i.e., whether the prescribed vehicle turning condition exists) by using the target yaw rate γ calculated in the target vehicle behavior calculation processing in step S200 as the turning requirement value. Specifically, whether the turning of the vehicle is requested is determined according to whether or not the target yaw rate γ, i.e., the turning requirement value, is 0. In cases where the target yaw rate γ is not 0, the controller 8 determines that the turning of the vehicle is requested, and calculation processing for correcting (increasing) the charging power target value is performed in step S400. In cases where the target yaw rate γ is 0, the controller 8 determines that the turning of the vehicle is not requested and then the processing proceeds to step S500. Furthermore, whether the turning of the vehicle is requested or not may also be determined according to whether or not the detected steering angle θ of the steering wheel 5, the target lateral acceleration $G_y$, or the target lateral slipping angle β is 0.

For example, when the vehicle control apparatus is further configured to calculate the target yaw rate for the purpose of performing the lane departure avoidance control, the collision avoidance control or the like (e.g., when the controller 8 is configured to control the driving/braking forces of the motors 13 and 14 based on the target yaw rate), there is a situation in which the target yaw rate γ, the target lateral acceleration $G_y$, or the target lateral slipping angle β is not 0 even if the steering angle θ is zero. Thus, in such case, whether the turning of the vehicle is requested or not is determined more suitably by using the target yaw rate γ, the target lateral acceleration $G_y$, or the target lateral slipping angle β.

Charging Power Target Value Increase Calculation (Step S400)

FIG. 10 shows a flowchart illustrating the control flow of the processing of the charging power target value increase calculation executed in step S400 of FIG. 2.

In step S401 of FIG. 10, the controller 8 is configured to calculate a charging power increase amount P_turn (kW) the based on the turning requirement value obtained in step S300 of FIG. 2. For example, the controller 8 is configured to refer to a map such as one shown in FIG. 11 to determine the charging power increase amount P_turn based on the turning requirement value. As shown in FIG. 11, the charging power increase amount P_turn increases as the turning requirement value increases. In the map shown in FIG. 11, the charging power increase amount P_turn is shown as being linearly proportional to the turning requirement value. However, as long as the charging power increase amount P_turn increases with an increase in the turning requirement value, the present invention is not limited to such arrangement. The charging power increase amount P_turn is preferably set so that the charging power target value after the correction in step S400 of FIG. 2 does not fall far below the amount of power consumed by the motors 12 to 14.

Figure 12:
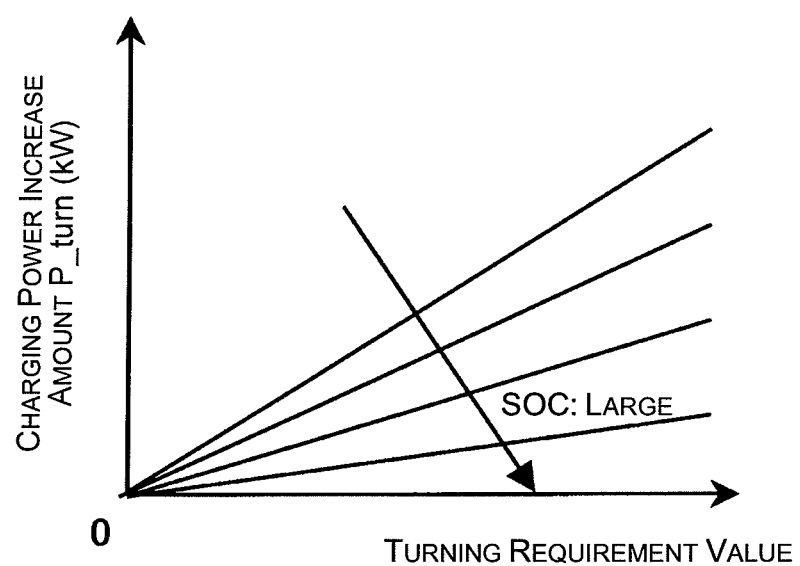
FIG. 12 is a schematic diagram showing a second example of the charging power increase amount map (table) used to determine the increase amount in the charging power with respect to the turning requirement value in accordance with the first embodiment of the present invention.

Alternatively, the map can be set as shown in FIG. 12 in which the charging power increase amount P_turn is set at a smaller value as the state of charge SOC of the power accumulating device 9 increases. As a result, overcharging of the power accumulating device 9 can be prevented when the charging power increase amount P_turn is calculated, and deterioration of the efficiency of the regenerating charging of the power accumulating device 9 can be suppressed.

In step S402, the controller 8 is configured to correct (increase) the charging power target value according to the charging power increase amount P_turn calculated in step S401. As shown in the following Equation (3), a final charging power target value P_new is calculated by adding the charging power increase amount P_turn to the basic target value P_soc of the charging power calculated based on the state of charge SOC in step S100 of FIG. 2.

$$P\_new = P\_soc + P\_turn \quad \text{Equation (3)}$$

In step S403, the controller 8 is configured to update the charging power target value supplied to the power accumulating device 9 to the final charging power target value P_new from the basic target value P_soc of the charging power.

Figure 13:
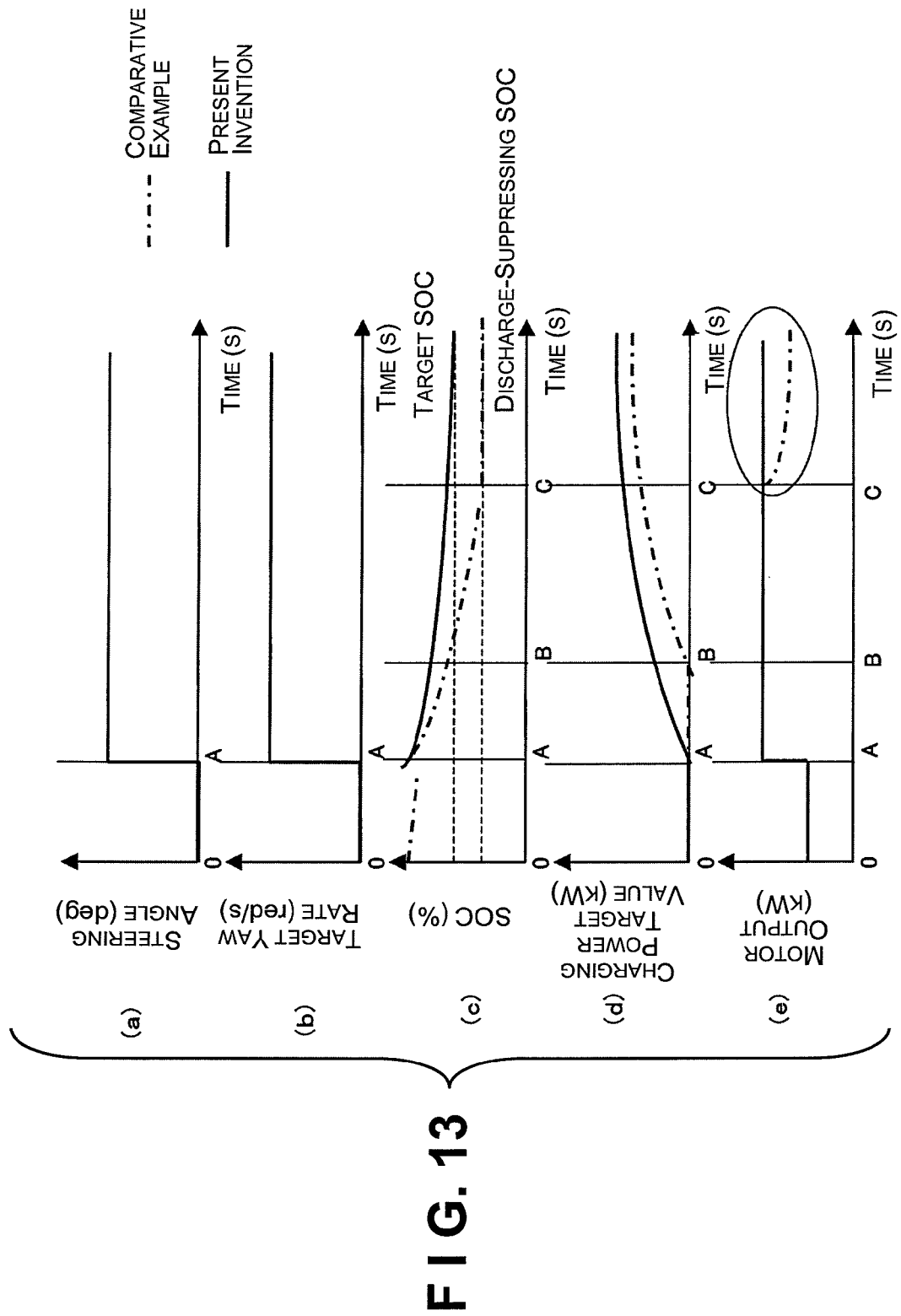
FIG. 13 is a time chart of the steering angle, the target yaw rate, the state of charge (SOC), the charging power target value, and the motor output in the vehicle control apparatus in accordance with the first embodiment of the present invention.

FIG. 13 is a time chart of the steering angle θ, the target yaw rate γ, the state of charge SOC, the charging power target value, and the motor output in the vehicle control apparatus in accordance with the first embodiment of the present invention. In the time chart shown in FIG. 13, the present invention in which the charging power target value is corrected (increased) during motor assist control is indicated with the sold lines and a comparative example in which the charging power target value is not corrected is indicated with single dot chain lines. FIG. 13 includes diagrams (a) to (e) illustrating the steering angle θ of the steering wheel 5 (the diagram (a)), the target yaw rate γ (the diagram (b)), the state of charge SOC (the diagram (c)), the charging power target value (generated power target value) of the generating device (i.e., the motor 12 in the first embodiment) according to the turning request value (the diagram (d)), and the output of the motors 13 and 14 (the diagram (e)). The steering wheel 5 is operated at time A in FIG. 13, and the target yaw rate γ is calculated in response to this operation of the steering wheel 5.

As shown in FIG. 13, in the case of the comparative example (shown with the single dot chain lines), the charging power target value of the generating device is calculated based only on how far the state of charge SOC falls below the target value of the state of charge SOC. Accordingly, power generation is initiated from time B in FIG. 13, where the state of charge SOC falls below the target value of the state of charge SOC. However, in cases where the power consumed by the motors (i.e., the motors 13 and 14 in the first embodiment) is large with respect to the charging power of the generating device (corresponding to the power generated by the motor 12 in the first embodiment), power is discharged from the power accumulating device 9 and supplied to the motors 13 and 14. Therefore, the state of charge SOC of the power accumulating device 9 continues to drop. As a result, as shown in the diagram (c) of FIG. 13, when the state of charge SOC reaches a lower limit value set for suppressing the power discharge from the power accumulating device 9 in the comparative example, the motor output of the motors 13 and 14 is suppressed as indicated by an encircled area in the diagram (e) of FIG. 13 in order to prevent excessive power discharge of the power accumulating device 9. Consequently, the desired vehicle behavior cannot be realized in the comparative example.

On the other hand, in the present invention, from time A in FIG. 13 where it is determined from the target yaw rate γ that turning of the vehicle is requested, i.e., from the time that turning of the vehicle is initiated, the charging power target value is increased as shown in the diagram (d) of FIG. 13. Therefore, the motor 12 begins to generate electric power. Since the power discharged from the power accumulating device 9 is suppressed during turning regardless of the target value of the state of charge SOC, a time period in which the motor assist control is performed can be longer than the comparative example in the present invention. Therefore, the actual vehicle behavior can follow the target vehicle behavior more readily in the present invention than in the comparative example.

Driving Force Command Value Calculation (Step S500)

In step S500, the controller 8 is configured to calculate the driving force command values for the wheels 1 to 4 to realize the target vehicle behavior indicated by the target vehicle behavior value calculated in step S200.

Figure 14:
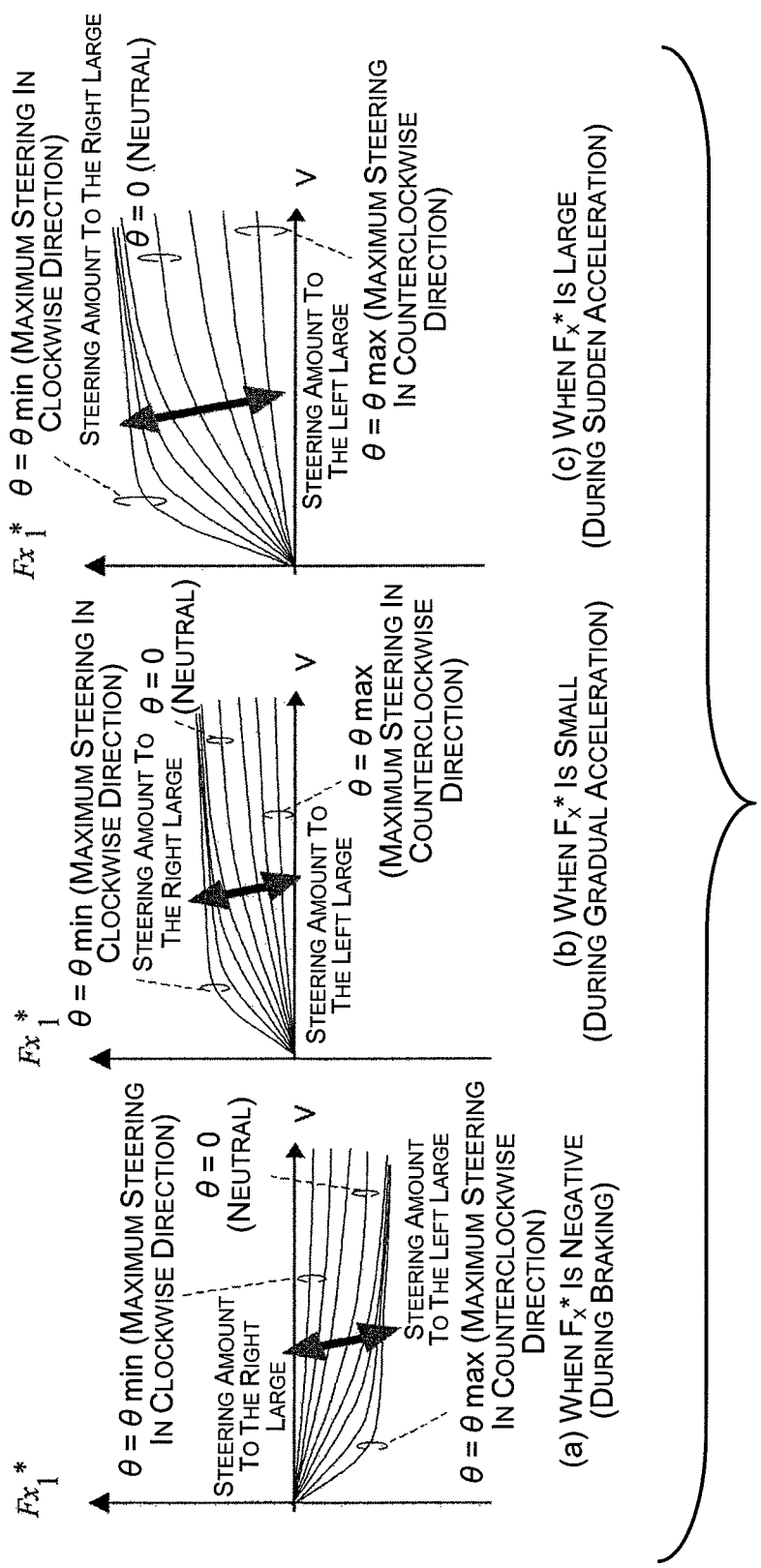
FIG. 14 is a schematic diagram showing one example of a target driving force distribution map for a left front wheel used in the vehicle control apparatus in accordance with the first embodiment of the present invention.
Figure 15:
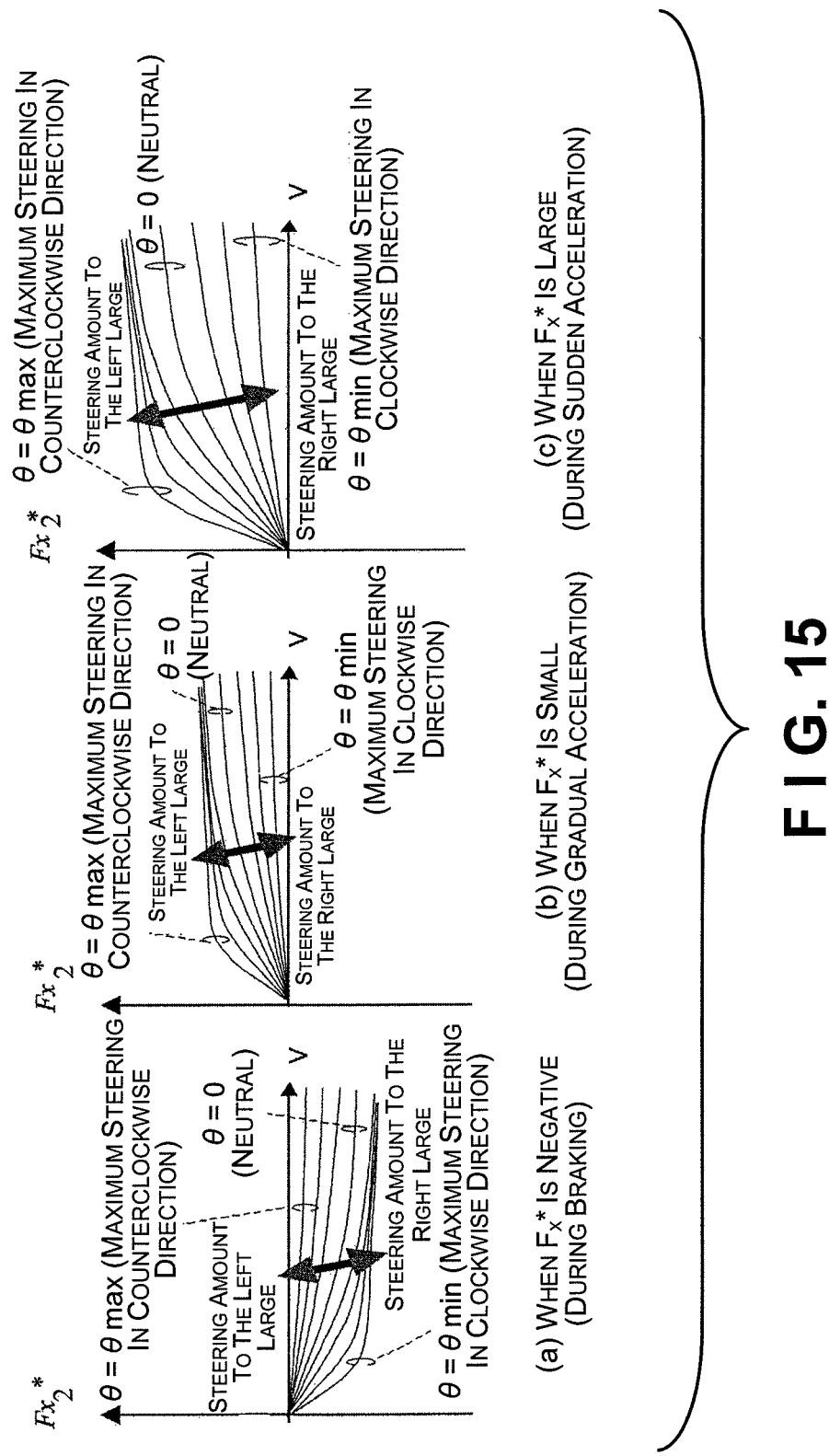
FIG. 15 is a diagram showing one example of a target driving force distribution map for the right front wheel used in the vehicle control apparatus in accordance with the first embodiment of the present invention.
Figure 16:
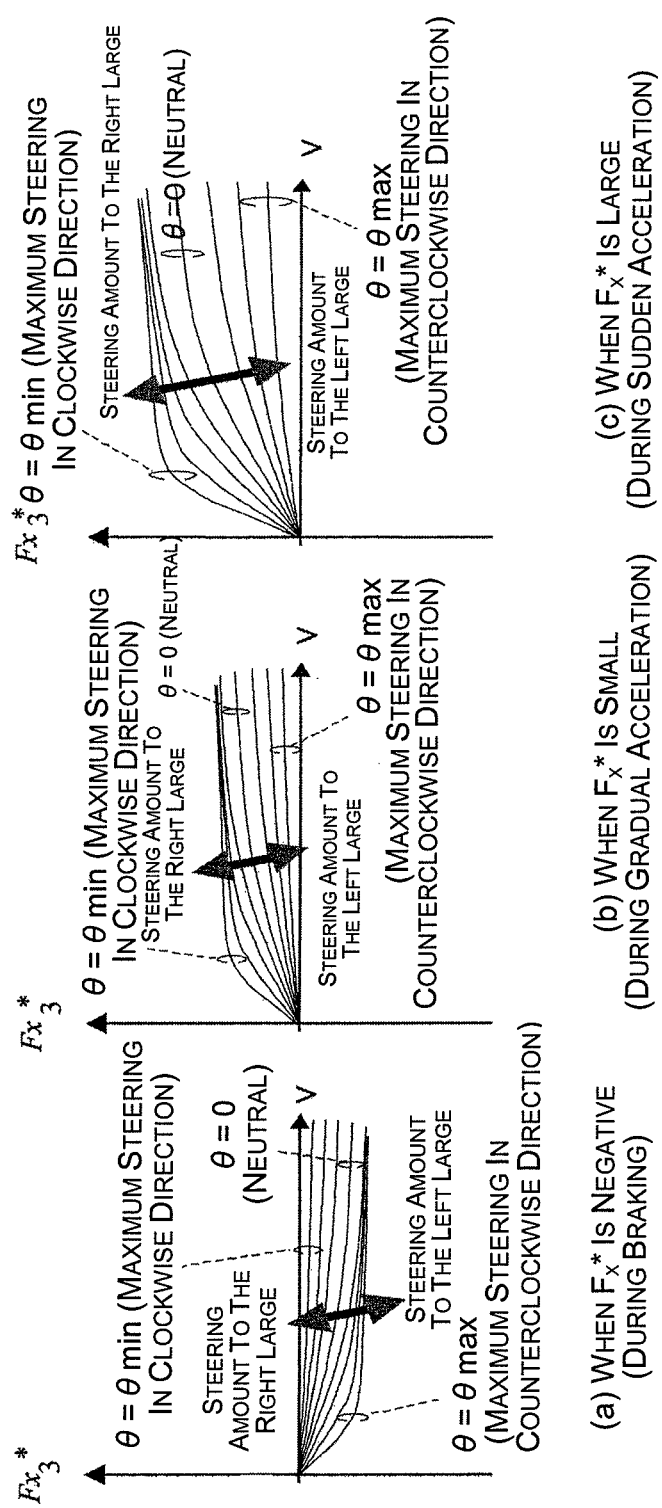
FIG. 16 is a diagram showing one example of a target driving force distribution map for the left rear wheel used in the vehicle control apparatus in accordance with the first embodiment of the present invention.

More specifically, the controller 8 is configured to calculate the driving force command values $Fx_i^*$ (i=1, 2, 3, 4) for the wheels 1 to 4 (the driving force command value $Fx_1^*$ for the left front wheel 1, the driving force command value $Fx_2^*$ for the right front wheel 2, the driving force command value $Fx_3^*$ for the left rear wheel 3, and the driving force command value $Fx_4^*$ for the right rear wheel 4) with reference to driving force distribution maps for the respective wheels based on the steering angle θ, the vehicle speed V, and the force (target value) $F_x^*$ acting in the front-rear direction of the vehicle. For example, the driving force distribution maps are set as shown in FIGS. 14 to 17. FIG. 14 is a schematic diagram showing one example of the target driving force distribution map for the left front wheel 1. FIG. 15 is a diagram showing one example of the target driving force distribution map for the right front wheel 2. FIG. 16 is a diagram showing one example of the target driving force distribution map for the left rear wheel 3. FIG. 17 is a diagram showing one example of the target driving force distribution map for the right rear wheel 4.

The map setting method for setting the target driving force distribution maps shown in FIGS. 14 to 17 is similar to the method used to set the target yaw rate map shown in FIG. 9 used in the target vehicle behavior calculation in step S200 described above. The driving forces $Fx_i'$ (i=1, 2, 3, 4) for the wheels 1 to 4 corresponding to the steering angle θ', the vehicle speed V', and the force Fx' oriented in the front-rear direction of the vehicle when each simulation or experimentation was performed are set as the driving force command values $Fx_i^*$ (i=1, 2, 3, 4).

Operating Point Control (Step S600)

In step S600 of FIG. 2, the controller 8 is configured to control the output torque values of the engine 10 and the motors 13 and 14, the gear shift ratio of the gear shift mechanism 11, and the engagement/disengagement of the clutch 20 to realize the driving force command values $Fx_i^*$ (i=1, 2, 3, 4) calculated in step S500.

Furthermore, the controller 8 is configured to control the output torque of the engine 10 and the torque of the motor 12 so that the charging power target value for the charging power supplied to the power accumulating device 9 (i.e., the target value of the power generated by the motor 12) is achieved.

For example, regarding the operating point of the engine 10, the controller 8 is preferably configured to determine the respective operating points of the engine 10 to reduce the amount of fuel consumed during operation of the vehicle by a known method described in, for example, Japanese Laid-Open Patent Application Publication No. 2000-32608, Japanese Laid-Open Patent Application Publication No. 2001-238305, or the like. In such case, the fuel consumption characteristics of the engine 10 and the loss characteristics of the motor 12 are taken into account, and an engine power requirement value is calculated from a sum of the front wheel power requirement value that realizes the left and right front wheel driving forces ($Fx_1^*+Fx_2^*$) and the motor driving power requirement value that realizes the charging power target value. The engine power that corresponds to the engine power requirement value is output, and the engine operating point that allows the engine 10 to operate at maximum efficiency is determined. As a result, the operating point that allows the highest amount of charging of the power accumulating device 9 for the amount of fuel consumption can be realized.

Moreover, regarding the operating point of the motor 12, the controller 8 is preferably configured to calculate a torque command value tTm_f (Nm) for the motor 12 by dividing the charging power target value (target value of the power generated by the motor 12) by the rpm (revolutions per minute) of the engine 10. The rpm of the engine 10 is preferably detected by an rpm sensor (not shown). The controller 8 is preferably configured to perform the vector control of the torque of the motor 12 via the inverter 18 based on of the calculated torque command value tTm_f (Nm).

Regarding the operating point of the motor 13, the controller 8 is preferably calculate a torque command value tTm_rL (Nm) for the motor 13 by first multiplying the driving force command value $Fx_3^*$ for the left rear wheel 3 by the tire radius of the left rear wheel 3, and then dividing the resulted value by the motor speed reduction ratio. The controller 8 is preferably configured to perform the vector control of the torque of the motor 13 based on the calculated torque command value tTm_rL (Nm).

Similarly, regarding the operating point of the motor 14, the controller 8 is preferably calculate a torque command value tTm_rR (Nm) for the motor 14 by first multiplying the driving force command value $Fx_4^*$ for the right rear wheel 4 by the tire radius of the right rear wheel 4, and then dividing the resulted value by the motor speed reduction ratio. The controller 8 is preferably configured to perform the vector control of the torque of the motor 14 based on the calculated torque command value tTm_rR (Nm).

Second Embodiment

Figure 18:
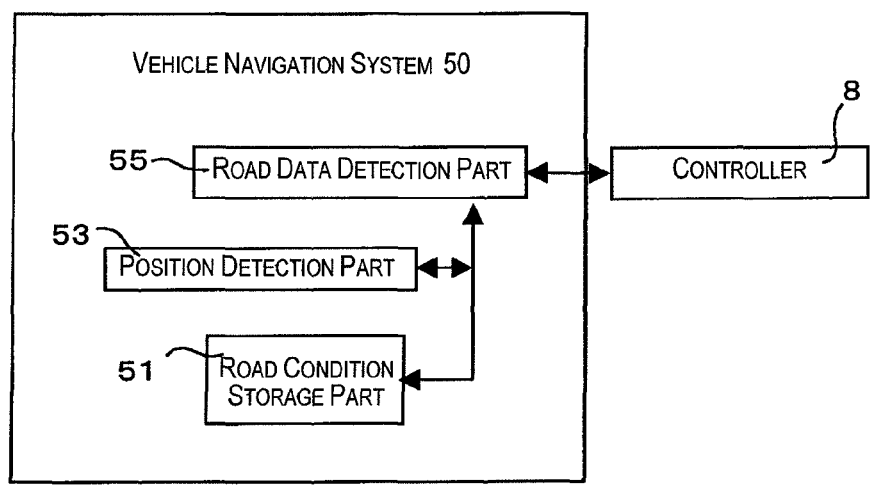
FIG. 18 is a schematic diagram showing one example of a vehicle navigation system coupled to a controller of a vehicle control apparatus in accordance with a second embodiment of the present invention.

Referring now to FIG. 18, a vehicle control apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle control apparatus of the second embodiment differs from the vehicle control apparatus of the first embodiment illustrated in FIG. 1 in that a vehicle navigation system 50 mounted in the vehicle is operatively coupled to the controller 8 in the second embodiment. More specifically, in the second embodiment, the controller 8 is configured to use a curvature ρ of the road in front of the vehicle detected by the vehicle navigation system 50 as the turning requirement value. Alternatively, the controller 8 in the second embodiment can be configured to estimate or calculate a predicted target yaw rate, a predicted steering angle θ of the steering wheel 5, or the like based on the curvature ρ of the road in front of the vehicle detected by the vehicle navigation system 50 and to use one of those predicted values as the turning requirement value. Thus, in the vehicle control apparatus of the second embodiment, the main control similar to that of the first embodiment illustrated in FIG. 2 is performed using such turning requirement value in steps S300 and S400 of FIG. 2.

As shown in FIG. 18, the vehicle navigation system 50 includes a road condition storage part 51, a position detection part 53 and a road data detection part 55. The road condition storage part 51 is configured and arranged to store data relating to the road conditions, and to read out the road condition data stored therein. The position detection part 53 includes a GPS receiver, a gyrocompass, or the like, and configured and arranged to detect the current position of the vehicle. The road data detection part 55 is configured and arranged to acquire data that relates to a selected road and that relates to the road conditions in front of the current position of the vehicle (e.g., several meters in front of the current position of the vehicle) from the road condition storage part 51. The road condition data stored in the road condition storage part 51 includes the slope of the road, the curvature radius or curvature ρ of the road, and the like. For example, the road condition storage part 51 has a conventional storage medium such as a CD-ROM, DVD-ROM, or the like in which data relating to the road conditions (the road condition date) is stored in advance. The road condition storage part 51 further includes a conventional driving device of the storage medium. The road data detection part 55 includes a conventional microcomputer, memory, and the like that are electrically coupled to the road condition storage part 51 and the position detection part 53. The road data detection part 55 is further electrically coupled to the controller 8, and can transmit the road condition data of the road in front of the vehicle to the controller 8. The vehicle navigation system 50 is conventional system that is well known in the art. Since vehicle navigation system 50 is well known in the art, the structures thereof will not be discussed or illustrated in detail herein.

As the curvature ρ of the road in front of the vehicle increases, the need for turning of the vehicle becomes stronger (i.e., the vehicle is required to turn sharply). Accordingly, the controller 8 is configured to refer to the map such as the one shown in FIG. 11 or 12 using the curvature ρ of the road as the turning requirement value. More specifically, the charging power increase amount P_turn becomes larger as the curvature ρ of the road increases. Alternatively, the controller 8 can be configured to determine the target yaw rate γ (the predicted target yaw rate) in the road in front of the vehicle by dividing the current vehicle speed V by the curvature ρ of the road (γ=V/ρ), and to use the calculated target yaw rate γ as the turning requirement value. Moreover, the controller 8 can be configured to refer to the map shown in FIG. 9 to determine a predicted value of the steering angle θ of the steering wheel 5 to be used as the turning requirement value based on the target yaw rate γ (the predicted target yaw rate), the current vehicle speed V, and the force $F_x^*$ oriented in the front-rear direction of the vehicle. In such case, the charging power increase amount P_turn increases as the predicted value of the steering angle θ increases. Furthermore, the predicted target lateral acceleration $G_y$ on the road in front of the vehicle and/or the predicted target lateral slipping angle β on the road in front of the vehicle can also be determined as the turning requirement value based on the target yaw rate γ (the predicted target yaw rate).

Accordingly, in the second embodiment of the present invention, the turning requirement that will occur in the future can be determined based on the curvature ρ of the road according to the information from the vehicle navigation system 50. Therefore, charging of the power accumulating device 9 can be performed in advance prior to entering a curved road. Thus, the state of charge SOC of the power accumulating device 9 can be increased beforehand in accordance with the predicted turning requirement value, and the time period in which the motor assist control to achieve the target vehicle behavior on the curved road can be ensured.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle control apparatus comprising:
a motor unit configured and arranged to generate an independent driving/braking force for at least each of left and right driving wheels;
a power accumulating device configured and arranged to supply electric power to the motor unit;
a charging power control section configured to set charging power supplied to the power accumulating device in accordance with a power accumulation state of the power accumulating device;
a vehicle state detecting section configured to detect an operating state of the vehicle;
a braking/driving force control section configured to control at least one of a braking force and a driving force generated by the motor unit based on the operating state of the vehicle detected by the vehicle state detecting section;
a turning requirement determination section configured to determine whether a prescribed vehicle turning condition exists, which indicates the vehicle is requested to turn; and
a charging power correction section configured to increase the charging power set by the charging power control section in response to the turning requirement determination section determining that the prescribed vehicle turning condition exists,
the turning requirement determination section being further configured to detect a turning requirement value of the vehicle based on one of a target yaw rate of the vehicle, a target lateral acceleration of the vehicle, and a lateral slipping angle of the vehicle, and to determine whether the prescribed vehicle turning condition exists based on the turning requirement value detected, and
the charging power correction section being configured to increase the charging power in accordance with the turning requirement value such that the charging power becomes higher as the turning requirement value becomes higher, the charging power increased by the charging power correction section being commenced to be supplied to the power accumulating device in response to the turning requirement determination section determining that the prescribed vehicle turning condition exists and the vehicle is turning, such that the charging power correction section increases the charging power to a level that is higher while the vehicle is turning than a level of the charging power that exists while the vehicle is not turning.

2. A vehicle control apparatus comprising:
a motor unit configured and arranged to generate an independent driving/braking force for at least each of left and right driving wheels;
a power accumulating device configured and arranged to supply electric power to the motor unit;
a charging power control section configured to set charging power supplied to the power accumulating device in accordance with a power accumulation state of the power accumulating device;
a vehicle state detecting section configured to detect an operating state of the vehicle;
a braking/driving force control section configured to control at least one of a braking force and a driving force generated by the motor unit based on the operating state of the vehicle detected by the vehicle state detecting section;

a turning requirement determination section configured to determine whether a prescribed vehicle turning condition exists, which indicates the vehicle is requested to turn; and a charging power correction section configured to increase the charging power set by the charging power control section in response to the turning requirement determination section determining that the prescribed vehicle turning condition exists, the turning requirement determination section being further configured to detect a turning requirement value of the vehicle based on one of a target yaw rate of the vehicle, a target lateral acceleration of the vehicle, and a lateral slipping angle of the vehicle, and to determine whether the prescribed vehicle turning condition exists based on the turning requirement value detected, and the charging power correction section being configured to increase the charging power in accordance with the turning requirement value such that the charging power becomes higher as the turning requirement value becomes higher, the charging power increased by the charging power correction section being commenced to be supplied to the power accumulating device in response to the turning requirement determination section determining that the prescribed vehicle turning condition exists and the vehicle is turning, such that the charging power correction section increases the charging power to a level that is higher while the vehicle is turning than a level of the charging power that exists while the vehicle is not turning, the charging power correction section being configured to adjust the charging power supplied to the power accumulating device such that as the power accumulation state of the power accumulating device becomes higher, an increase amount in the charging power becomes smaller.

3. The vehicle control apparatus according to claim 1, wherein
the charging power control section is operatively coupled to a power generating device configured and arranged to supply the charging power to the power accumulating device, and
the charging power correction section is configured to increase a target value of a generated power of the power generating device to increase the charging power supplied to the power accumulating device.

4. The vehicle control apparatus according to claim 1, wherein
the turning requirement determination section is further configured to detect at least one of a steering angle of a vehicle steering wheel, the target yaw rate, the target lateral acceleration, and a target lateral slipping angle as the turning requirement value.

5. The vehicle control apparatus according to claim 1, wherein
the turning requirement determination section is operatively coupled to a navigation system mounted to the vehicle, and is further configured to determine whether the prescribed vehicle turning condition exists according to a curvature of a road in front of the vehicle determined based on information obtained from the navigation system.

6. The vehicle control apparatus according to claim 5, wherein
the turning requirement determination section is further configured to detect as the turning requirement value at least one of the curvature of the road in front of the vehicle based on information obtained from the navigation system,
a predicted value of a steering angle of a vehicle steering wheel obtained based on the curvature of the road in front of the vehicle,
a predicted value of a target yaw rate obtained based on the curvature of the road in front of the vehicle,
a predicted value of a target lateral acceleration obtained based on the curvature of the road in front of the vehicle, and
a predicted value of a target lateral slipping angle obtained based on the curvature of the road in front of the vehicle.

7. The vehicle control apparatus according to claim 1, wherein
the braking/driving force control section is configured to control the at least one of the braking force and the driving force generated by the motor unit in accordance with the turning requirement value.

8. A vehicle control apparatus comprising:
driving/braking force generating means for generating an independent driving/braking force for at least each of left and right driving wheels using a motor unit;
power accumulating means for supplying electric power to the motor unit;
charging power controlling means for setting charging power supplied to the power accumulating means in accordance with a power accumulation state of the power accumulating means;
vehicle state detecting means for detecting an operating state of the vehicle;
braking/driving force controlling means for controlling at least one of a braking force and a driving force generated by the driving/braking force generating means based on the operating state of the vehicle detected by the vehicle state detecting means;
turning requirement determining means for determining whether a prescribed vehicle turning condition exists, which indicates the vehicle is requested to turn; and
charging power correcting means for increasing the charging power set by the charging power controlling means in response to the turning requirement determining means determining that the prescribed vehicle turning condition exists,
the turning requirement determining means further detecting a turning requirement value of the vehicle based on one of a target yaw rate of the vehicle, a target lateral acceleration of the vehicle, and a lateral slipping angle of the vehicle, and determining whether the prescribed vehicle turning condition exists based on the turning requirement value detected, and
the charging power correcting means further increasing the charging power in accordance with the turning requirement value such that the charging power becomes higher as the turning requirement value becomes higher, the charging power increased by the charging power correcting means being commenced to be supplied to the power accumulating means in response to the turning requirement determining means determining that the prescribed vehicle turning condition exists and the vehicle is turning, such that the charging power correcting means increases the charging power while the vehicle is turning to a level that is higher than a level of the charging power that exists while the vehicle is not turning.

9. A vehicle control method comprising:
generating an independent driving/braking force for at least each of left and right driving wheels using a motor unit;
supplying electric power from a power accumulating device to the motor unit;
setting charging power supplied to the power accumulating device in accordance with a power accumulation state of the power accumulating device;
detecting an operating state of the vehicle;
controlling at least one of a braking force and a driving force generated by the motor unit based on the operating state of the vehicle detected;
determining whether a prescribed vehicle turning condition exists, which indicates the vehicle is requested to turn;
increasing the charging power in response to determining that the prescribed vehicle turning condition exists; and
supplying the charging power to the power accumulating device,
the determining of the existence of the prescribed vehicle turning condition further including detecting a turning requirement value of the vehicle based on one of a target yaw rate of the vehicle, a target lateral acceleration of the vehicle, and a lateral slipping angle of the vehicle, and determining whether the prescribed vehicle turning condition exists based on the turning requirement value detected, and the increasing of the charging power further including increasing the charging power in accordance with the turning requirement value such that the charging power becomes higher as the turning requirement value becomes higher, the supplying of the charging power to the power accumulating device being commenced in response to determining that the prescribed vehicle turning condition exists and the vehicle is turning, and the increasing of the charging power occurring such that the charging power is increased to a level while the vehicle is turning that is higher than a level of the charging power that exists while the vehicle is not turning.

* * * * *